United States Patent
Godon et al.

(10) Patent No.: US 10,836,072 B2
(45) Date of Patent: *Nov. 17, 2020

(54) METHOD OF FABRICATING AN IMPREGNATED FIBER ASSEMBLY

(71) Applicants: SAFRAN AIRCRAFT ENGINES, Paris (FR); SAFRAN, Paris (FR)

(72) Inventors: Thierry Claude Henri Godon, Moissy-Cramayel (FR); Michael Podgorski, Moissy-Cramayel (FR)

(73) Assignees: SAFRAN AIRCRAFT ENGINES, Paris (FR); SAFRAN, Paris (FR)

( * ) Notice: Subject to any disclaimer, the term of this patent is extended or adjusted under 35 U.S.C. 154(b) by 118 days.

This patent is subject to a terminal disclaimer.

(21) Appl. No.: 15/766,557

(22) PCT Filed: Oct. 5, 2016

(86) PCT No.: PCT/FR2016/052550
§ 371 (c)(1),
(2) Date: Apr. 6, 2018

(87) PCT Pub. No.: WO2017/060615
PCT Pub. Date: Apr. 13, 2017

(65) Prior Publication Data
US 2018/0281228 A1    Oct. 4, 2018

(30) Foreign Application Priority Data
Oct. 8, 2015  (FR) ...................................... 15 59566

(51) Int. Cl.
*B28B 1/20*    (2006.01)
*B28B 21/30*   (2006.01)
(Continued)

(52) U.S. Cl.
CPC .................. *B28B 1/20* (2013.01); *B22F 7/04* (2013.01); *B28B 21/30* (2013.01);
(Continued)

(58) Field of Classification Search
CPC ......... B28B 1/20; B28B 11/243; B28B 21/30; C04B 35/18; C04B 35/62222;
(Continued)

(56) References Cited

U.S. PATENT DOCUMENTS 2,170,931 A *  8/1939  Schafer .................... B29B 11/06
                                                    264/77
4,994,418 A    2/1991  Yamakawa et al.
(Continued)

FOREIGN PATENT DOCUMENTS

CN    101628822 A    1/2010
DE    42 38 878 A1    5/1993
(Continued)

OTHER PUBLICATIONS

Human translation of DE 4238878 C, Translated by: LinguaLinx Language Solutions, Inc. Hedley Park Place, 433 River Street Troy, NY (Year: 2019).*
(Continued)

*Primary Examiner* — Michael M. Robinson
(74) *Attorney, Agent, or Firm* — Pillsbury Winthrop Shaw Pittman LLP

(57) ABSTRACT

A method of fabricating an impregnated fiber assembly, the method including introducing a first suspension including a first powder of solid particles into an inside volume defined by an inside face of a first fiber texture of hollow shape placed in a mold, an outer face of the first fiber texture being present facing a wall of the mold; using a centrifugal force to impregnate the first fiber texture with the first suspension by rotating the mold; after impregnating the first texture,
(Continued)

positioning a second fiber texture on the inside face of the first fiber texture to obtain a fiber assembly; introducing a second suspension including a second powder of solid particles into the inside volume after putting the second fiber texture into position; and using a centrifugal force to impregnate the second fiber texture with the second suspension by rotating the mold to obtain an impregnated fiber assembly.

13 Claims, 4 Drawing Sheets

(51) Int. Cl.
| | |
|---|---|
| B29C 41/04 | (2006.01) |
| C04B 35/622 | (2006.01) |
| B29C 70/02 | (2006.01) |
| C04B 35/80 | (2006.01) |
| B22D 13/00 | (2006.01) |
| C04B 35/111 | (2006.01) |
| B29C 70/32 | (2006.01) |
| B28B 23/00 | (2006.01) |
| B32B 18/00 | (2006.01) |
| C22C 47/06 | (2006.01) |
| B22F 7/04 | (2006.01) |
| C22C 47/14 | (2006.01) |
| C04B 35/18 | (2006.01) |
| C04B 35/78 | (2006.01) |
| C22C 49/11 | (2006.01) |
| C22C 49/06 | (2006.01) |
| C22C 49/14 | (2006.01) |
| C04B 111/00 | (2006.01) |

(52) U.S. Cl.
CPC .......... *B28B 23/0006* (2013.01); *B29C 41/04* (2013.01); *B29C 70/025* (2013.01); *B29C 70/323* (2013.01); *C04B 35/111* (2013.01); *C04B 35/18* (2013.01); *C04B 35/622* (2013.01); *C04B 35/62222* (2013.01); *C04B 35/78* (2013.01); *C04B 35/803* (2013.01); *C22C 47/06* (2013.01); *C22C 47/066* (2013.01); *C22C 47/14* (2013.01); *B22F 2007/045* (2013.01); *B22F 2998/10* (2013.01); *B22F 2999/00* (2013.01); *C04B 2111/00431* (2013.01); *C04B 2111/00577* (2013.01); *C04B 2111/00913* (2013.01); *C04B 2235/5224* (2013.01); *C04B 2235/5252* (2013.01); *C04B 2235/5256* (2013.01); *C04B 2235/602* (2013.01); *C04B 2235/606* (2013.01); *C04B 2235/616* (2013.01); *C04B 2237/343* (2013.01); *C04B 2237/38* (2013.01); *C04B 2237/704* (2013.01); *C22C 49/06* (2013.01); *C22C 49/11* (2013.01); *C22C 49/14* (2013.01)

(58) Field of Classification Search
CPC .......... C04B 35/78; C04B 2111/00431; C04B 2111/00577; C04B 2111/00913; C04B 2235/616; C04B 35/117; C04B 35/573; C04B 35/6263; C04B 35/64; B29C 70/025; B29C 70/323
See application file for complete search history.

(56) References Cited

U.S. PATENT DOCUMENTS

| | | | |
|---|---|---|---|
| 5,025,849 A | 6/1991 | Karmarkar et al. | |
| 5,453,230 A * | 9/1995 | McClellan | B29C 33/123 264/255 |
| 6,497,776 B1 | 12/2002 | Butler et al. | |
| 2005/0017410 A1* | 1/2005 | Tartar | B29C 41/04 264/311 |
| 2010/0015332 A1 | 1/2010 | Rollin et al. | |
| 2010/0144227 A1* | 6/2010 | Coupe | B29C 70/24 442/207 |
| 2011/0168092 A1 | 7/2011 | Clark | |

FOREIGN PATENT DOCUMENTS

| | | | | |
|---|---|---|---|---|
| DE | 4238878 C2 | * | 5/1997 | ............... B28B 1/20 |
| DE | 10 2009 011585 A1 | | 9/2010 | |
| EP | 0 240 177 A2 | | 10/1987 | |
| EP | 2 181 974 A1 | | 5/2010 | |
| GB | 798 045 A | | 7/1958 | |
| GB | 2264719 A | | 9/1993 | |
| JP | S62-230680 A | | 10/1987 | |
| JP | 2002-020965 A | | 1/2002 | |
| WO | WO 2006/136755 A2 | | 12/2006 | |

OTHER PUBLICATIONS

International Search Report as issued in International Patent Application No. PCT/FR2016/052550, dated Jan. 18, 2017.
Office Communication as issued in European Patent Application No. 16731221.4, dated Apr. 2, 2020.
Notice of Reasons for Refusal as issued in Japanese Patent Application No. 2017-562023, dated May 12, 2020.

* cited by examiner

METHOD OF FABRICATING AN IMPREGNATED FIBER ASSEMBLY

CROSS-REFERENCE TO RELATED APPLICATIONS

This application is the U.S. National Stage of PCT/FR2016/052550, filed Oct. 5, 2016, which in turn claims priority to French patent application number 1559566, filed Oct. 8, 2015. The content of these applications are incorporated herein by reference in their entireties.

BACKGROUND OF THE INVENTION

The invention relates to a method of fabricating an impregnated fiber assembly.

Composite materials, and in particular oxide/oxide composites, can be prepared in known manner by stacking pre-impregnated plies obtained by two-dimensional weaving. That type of method can nevertheless lead to composite materials being obtained that are stratified and sensitive to the phenomenon of delamination when subjected to mechanical stress.

In order to improve the ability of composite materials to withstand delamination, attempts have been made to avoid obtaining interfaces between the two-dimensional plies, and possibly to use one or more three-dimensional fabrics instead of two-dimensional fabrics in order to constitute the fiber reinforcement of the part that is to be obtained. Proposals have been made to form the matrix by introducing solid particles into the fiber reinforcement followed by sintering those particles. In order to introduce particles into the fiber reinforcement, various known methods have been used, such as submicron powder aspiration (SPA). In such methods, the fiber reinforcement is impregnated with a slurry comprising in particular the powder of particles in suspension in a liquid medium, the slurry possibly also including an organic binder and also a dispersing agent.

Nevertheless, it has been found that those methods can lead to results that are not entirely satisfactory when the fiber reinforcement is complex in shape, in particular a hollow shape, possibly of relatively great thickness or with zones of extra thickness. Specifically, under such circumstances, those methods can be relatively lengthy and difficult to perform in order to obtain the desired distribution of particles inside the fiber reinforcement. In particular, for a part that is in the form of a hollow cone, in order to avoid folds in the fabric(s), it can be necessary to use tooling that is relatively complex and made up of a plurality of portions, together with complex sequences for preparing molding and unmolding.

There therefore exists a need to have a method making it possible in simple manner to obtain a controlled distribution of solid particles inside fiber reinforcement of hollow shape and presenting thickness that is relatively great, and possibly zones of extra thickness.

In particular, there exists a need to have a method making it possible in simple manner to obtain a uniform distribution of solid particles inside such reinforcement.

OBJECT AND SUMMARY OF THE INVENTION

In a first aspect, the invention provides a method of fabricating an impregnated fiber assembly, the method comprising at least the following steps:
  introducing a first suspension comprising a first powder of solid particles of ceramic material, of metal material, or of carbon material into an inside volume defined by an inside face of a first fiber texture of hollow shape placed in a mold, an outer face of the first fiber texture being present facing a wall of the mold;
  using the action of centrifugal force to impregnate the first fiber texture with the first suspension by rotating the mold;
  after impregnating the first texture with the first suspension, positioning a second fiber texture on the inside face of the first fiber texture in order to obtain a fiber assembly;
  introducing a second suspension comprising a second powder of solid particles made of ceramic material, of metal material, or of carbon, into the inside volume after putting the second fiber texture into position; and
  using the action of centrifugal force to impregnate the second fiber texture with the second suspension by rotating the mold in order to obtain an impregnated fiber assembly.

In a second aspect, the invention provides a method of fabricating an impregnated fiber assembly, the method comprising at least the following steps:
  introducing a first suspension comprising a first powder of solid particles of ceramic material, of metal material, or of carbon material into an inside volume defined by an inside face of a first fiber texture of hollow shape placed in a mold, an outer face of the first fiber texture being present facing a wall of the mold;
  using the action of centrifugal force to impregnate the first fiber texture with the first suspension by rotating the mold in order to fill the pores of the first fiber texture in part with the first powder;
  after impregnating the first texture with the first suspension, removing a first portion of the mold situated in a first region facing the outside face of the first fiber texture;
  positioning a second fiber texture on the outer face of the first fiber texture in the first region in order to obtain a fiber assembly;
  positioning a second mold portion in the first region, the second mold portion, once in position, being situated facing an outer face of the second fiber texture;
  introducing a second suspension comprising a second powder of solid particles made of ceramic material, of metal material, or of carbon into the inside volume, e.g. after putting the second fiber texture and the second mold portion into position; and
  using the action of centrifugal force to impregnate the first and second fiber textures with the second suspension by rotating the mold fitted with the second mold portion in order to obtain the impregnated fiber assembly, the second suspension passing through the first texture in order to reach the second texture during this impregnation step.

The fiber assembly is to constitute the fiber reinforcement of a composite material part.

The second powder may be different from the first powder. Thus, in an aspect, the material constituting the particles of the second powder may be different from the material constituting the particles of the first powder. In a variant, the mean size of the particles of the first powder may be different from the mean size of the particles of the second powder. Unless specified to the contrary, the term "mean size" is used to mean the size given by the half population statistical particle size distribution, written D50. It is also possible for the first and second powders to differ in terms of particle size distribution. In another variant, the particles of the first powder may be of a shape that is different from the particles of the second powder. In a variant or in combination, the concentration of solid particles of the first powder in the first suspension may be different from the concentration of the solid particles of the second powder in the second suspension.

In a variant, the first powder may be identical to the second powder.

In the first aspect, all or some of the porosity of the first fiber texture may be filled with the first powder after impregnation with the first suspension. Furthermore, it is possible for the second suspension to impregnate both the first and second fiber textures in the impregnated fiber assembly that is obtained when using the first aspect.

In a second aspect, only some of the porosity of the first texture is filled with the particles of the first powder as a result of the impregnation with the first suspension. Such partial filling enables the second suspension to pass through the first texture in order to impregnate the second texture. In order to fill the porosity of the first texture in part only, the first suspension may advantageously present a relatively low content of particles of the first powder, e.g. less than or equal to 20% (volume fraction), and/or the duration of impregnation with the first suspension may be relatively limited. The volume content of particles of the first powder in the first suspension may be equal to 20%, for example. It is also possible to seek to implement local impregnation of the first texture with the first suspension so as to leave one or more zones of the first texture that are impregnated little or not at all, these zones enabling the second suspension to pass through the first texture in order to reach the second texture.

The thickness of the first texture may be greater than or equal to 0.5 millimeters (mm), e.g. lying in the range 0.5 mm to 10 mm. The thickness of the second texture may be greater than or equal to 0.5 mm, e.g. lying in the range 0.5 mm to 10 mm. Thus, the thickness of the fiber assembly may be greater than or equal to 1 mm, e.g. lying in the range 1 mm to 20 mm. The thickness of a fiber texture or of a fiber assembly corresponds to its smallest transverse dimension.

In the above-described first and second aspects, rotating the mold causes centrifugal force to be applied on the first suspension in order to impregnate the first fiber texture. Once the first fiber texture is impregnated, the liquid medium of the first suspension may optionally be eliminated. After impregnating the first fiber texture, and optionally after eliminating the liquid medium of the first suspension, the mold is set into rotation once again in order to apply centrifugal force on the second suspension and thereby impregnate at least the second fiber texture with the second suspension.

Each of the two aspects of the invention makes it possible, under the action of the centrifugal force generated by rotating the mold, to obtain a fiber assembly having the first and second fiber textures in which solid particles are present. The particles are introduced in "portions" by initially introducing the particles into the first portion of the assembly constituted by the first fiber texture, and subsequently into the second portion of the assembly constituted by the second fiber texture.

The invention thus proposes a method that is relatively simple, enabling impregnated fiber assemblies to be obtained in controlled manner, which assemblies are relatively complex in shape, of thickness that is significant, and possibly present zones of extra thickness.

In both of the above-described aspects, the fact of performing impregnation by "portions" makes it possible to control in satisfactory manner the way particles are distributed in a fiber assembly of shape that is complex and that presents thickness that is relatively great, and in particular to obtain a uniform distribution of particles, should that be desired. Unlike the situation in which fiber reinforcement of relatively great thickness is impregnated by centrifuging with a continuous phase such as a resin, the fact of introducing solid particles into such fiber reinforcement presents an additional difficulty associated with the fact of managing to transport those particles through the array of pores. Although it is possible to obtain a satisfactory result when impregnating relatively thick fiber reinforcement with a resin by the action of centrifugal force, results of such quality are not always obtained when the resin is replaced with a suspension of particles.

The invention thus proposes a solution for solving the specific problem of introducing solid particles into the pores of fiber reinforcement that is relatively thick, this solution lying in the fact of impregnation of the fiber reinforcement being performed in "portions" under the action of centrifugal force.

In an implementation, the impregnation with the first suspension and the impregnation with the second suspension are carried out at different speeds of rotation of the mold.

In an implementation, the impregnation with the first suspension may be performed by imparting a first constant non-zero speed of rotation to the mold and then impregnation with the second suspension may be performed by imparting a second constant non-zero speed of rotation to the mold, the second speed of rotation being different from the first speed of rotation.

In an implementation, and in particular in the first aspect, the first speed of rotation may be greater than the second speed of rotation.

In a variant, and in particular in the second aspect, the first speed of rotation may be less than the second speed of rotation.

In an implementation, the direction of rotation of the mold may be reversed one or more times while impregnating with the first suspension and/or while impregnating with the second suspension.

Such an implementation is advantageous for making uniform the distribution of particles in the fiber assembly, when that is desired.

In a variant, the direction of rotation of the mold need not be modified throughout impregnation with the first suspension and/or throughout impregnation with the second suspension.

In an implementation, the first and/or second suspension may be introduced into the inside volume by spraying via one or more spray devices, the spray device(s) may be driven with movement in translation and/or rotation during spraying.

In an implementation, the first fiber texture may be axisymmetric. In a variant or in combination, the second fiber texture may be axisymmetric.

By way of example, the first and/or second fiber texture may be frustoconical in shape. In a variant, the first and/or second fiber texture may be cylindrical in shape.

In an implementation, the first fiber texture may be obtained by two-dimensional weaving or by three-dimensional weaving. Under such circumstances, the second fiber texture may also be obtained by two-dimensional weaving or by three-dimensional weaving.

In an implementation, the particles of the first powder may be made of ceramic material, e.g. of carbide, boride, oxide, or nitride type, of carbon, of metal, or of metal alloy. Independently or in combination, the particles of the second powder may be made of ceramic material, e.g. of carbide, boride, oxide, or nitride type, of carbon, of metal, or of metal alloy. By way of example, the particles of the first and second powders may be formed by a metal material selected from: aluminum, silicon, titanium, zirconium, and alloys thereof. When the particles are made of a metal material, the material may be suitable for oxidizing during heat treatment in order to form particles of metallic oxides which can then form the matrix of the part by sintering.

The yarns forming the first fiber texture may be made of refractory material. The first fiber texture may comprise yarns made of ceramic materials, e.g. of carbide, boride, oxide, or nitride type, of carbon, or of a metal alloy. In an implementation, the first fiber texture may comprise refractory oxide ceramic yarns and the particles of the first powder may be refractory oxide ceramic particles.

The yarns forming the second fiber texture may be made of refractory material. The second fiber texture may comprise yarns made of ceramic material, e.g. of carbide, boride, oxide, or nitride type, of carbon, or of metal alloy. In particular, the second fiber texture may comprise ceramic yarns of refractory oxide and the particles of the second powder may optionally be ceramic particles of refractory oxide.

The present invention also provides a method of fabricating a composite material part, the method comprising at least the following steps:
  fabricating a fiber assembly impregnated by performing a method as described above; and then
  forming a matrix phase from the particles of the first and second powders, thereby densifying the fiber assembly in order to obtain the composite material part.

The composite material part as obtained in this way may be a tube, a casing, or a turbine ring.

Before forming the matrix phase, it is possible to eliminate the liquid medium of the first and/or second suspensions impregnating the fiber assembly.

In an implementation, the matrix phase may be formed in full or in part by sintering the particles of the first and second powders.

Once the part has been obtained, it may be subjected in conventional manner to a machining step in order to give it the desired dimensions and/or a coating step in which it is coated with a thermal barrier or with an environmental barrier, for example.

BRIEF DESCRIPTION OF THE DRAWINGS

Other characteristics and advantages of the invention appear from the following description of particular implementations of the invention given as non-limiting examples and with reference to the accompanying drawings, in which.

In the figures, the relative dimensions of the various elements are not necessarily to scale, for reasons of legibility.

DETAILED DESCRIPTION OF IMPLEMENTATIONS

Examples of means suitable for use in forming the first and second fiber textures that are to be used in the context of a method of the invention are described initially.

These textures may be obtained by multilayer weaving between a plurality of layers of warp yarns and a plurality of layers of weft yarns. The multilayer weaving that is performed may in particular be an interlock weave, i.e. a weave in which each layer of weft yarns interlinks a plurality of layers of warp yarns with all of the yarns in a given weft column having the same movement in the weave plane. Naturally, other types of multilayer weaving could be used.

When the fiber textures are made by weaving, the weaving may be performed using warp yarns that extend in the longitudinal direction of the fiber textures, it being understood that weaving with weft yarns extending in this direction is also possible.

In an implementation, the yarns used may be refractory oxide ceramic yarns, silicon carbide yarns, or carbon yarns. Various suitable ways of performing multilayer weaving are described in Document WO 2006/136755.

The textures may also be obtained by assembling together at least two fiber structures. Under such circumstances, the two fiber structures may be bonded together, e.g. by stitching or by needling. In particular, each of the fiber structures may be obtained from a layer or a stack comprising a plurality of layers of:
  a one-dimensional (1D) fabric;
  a two-dimensional (2D) fabric;
  a braid;
  a knit;
  a felt;
  a one-dimensional (1D) sheet of yarns or tows or multi-directional (nD) sheets obtained by superposing a plurality of 1D sheets in different directions and bonding together the 1D sheets, e.g. by stitching, by a chemical bonding agent, or by needling.

With a stack of a plurality of layers, the layers may be bonded together, e.g. by stitching, by implanting yarns or rigid elements, or by needling.

Figure 1:
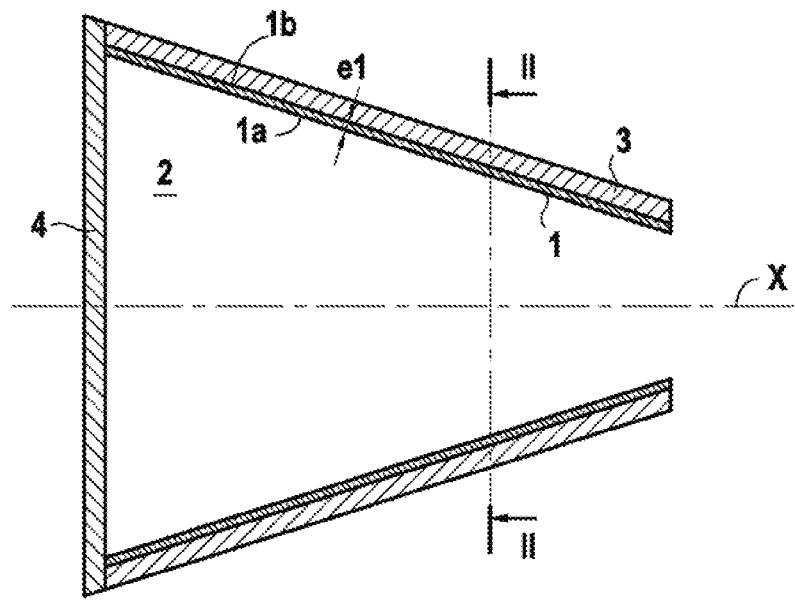
FIG. 1 shows a hollow fiber texture placed in a mold in order to be processed by a method of the invention.
Figure 2:
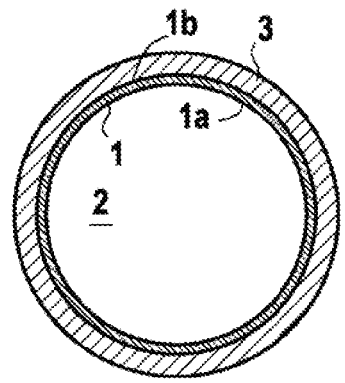
FIG. 2 is a section on II-II of FIG. 1.

Once the first hollow texture 1 has been fabricated, it is then placed in a mold by positioning the outside face 1b of the first texture 1 facing a side wall 3 of the mold, as shown in FIGS. 1 and 2. As shown, the first fiber texture 1 is hollow and defines an inside volume 2. In the example shown, the mold and the first texture 1 are of a shape that is axisymmetric, specifically frustoconical in this example. It would not go beyond the ambit of the invention for the mold and the first texture to have some other shape, such as a cylindrical shape, for example. The inside face 1a of the first texture 1 present in the mold defines an inside volume 2 in which the first and second suspensions are to be introduced. Prior to performing the impregnation step, the first texture 1 present in the mold may be dry and optionally need not contain any solid particles in its internal pores. In a variant, prior to being placed in the mold, the first texture 1 may be subjected to an impregnation step that leads to solid particles being introduced into its internal pores.

Once the first texture 1 has been introduced into the mold, the mold is closed at one of its ends by an end wall 4. The first texture 1 may be introduced into the mold manually. Once the first texture 1 has been introduced into the mold, it is held in position in the mold, e.g. by fastening edges of the first texture 1 to the mold, which fastening may be performed by fittings such as screws or by adhesive tape (Scotch®). It is also possible to hold the first texture 1 in the mold by means of a perforated hollow central core, e.g. in the form of a grid that is positioned facing the inside face 1a of the first texture 1. This central core presents a plurality of perforations enabling a liquid medium to pass through it in order to impregnate the first texture 1.

The thickness $e_1$ of the first texture 1 may be greater than or equal to 0.5 mm, e.g. lying in the range 0.5 mm to 10 mm.

The mold is connected to a rotation system (not shown) enabling the mold to be set into rotation about its axis of rotation X which, in the example shown, also corresponds to the longitudinal axis of the first texture 1.

Figure 3:
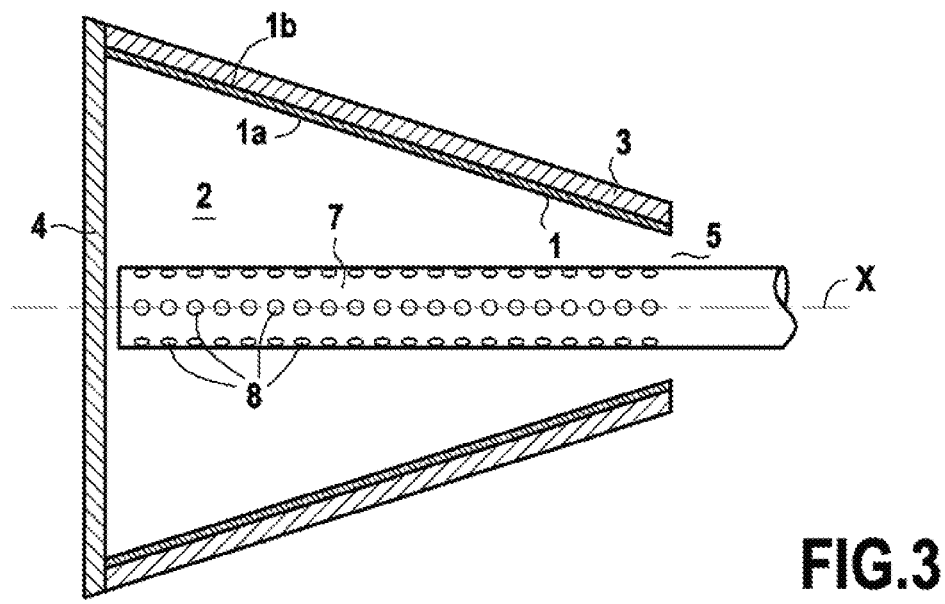
FIG. 3 shows the mold of FIGS. 1 and 2 provided with a spray device for the purpose of introducing a suspension of particles in the inside volume.

Once the first texture 1 has been placed in the mold, a spray device 7 for spraying a suspension of solid particles is then introduced into the mold via the end 5 of the mold that is situated remote from the end wall 4, as shown in FIG. 3. The spray device 7 presents a plurality of orifices 8 in its surface through which a first suspension of solid particles is to be introduced into the inside volume 2.

Figure 4:
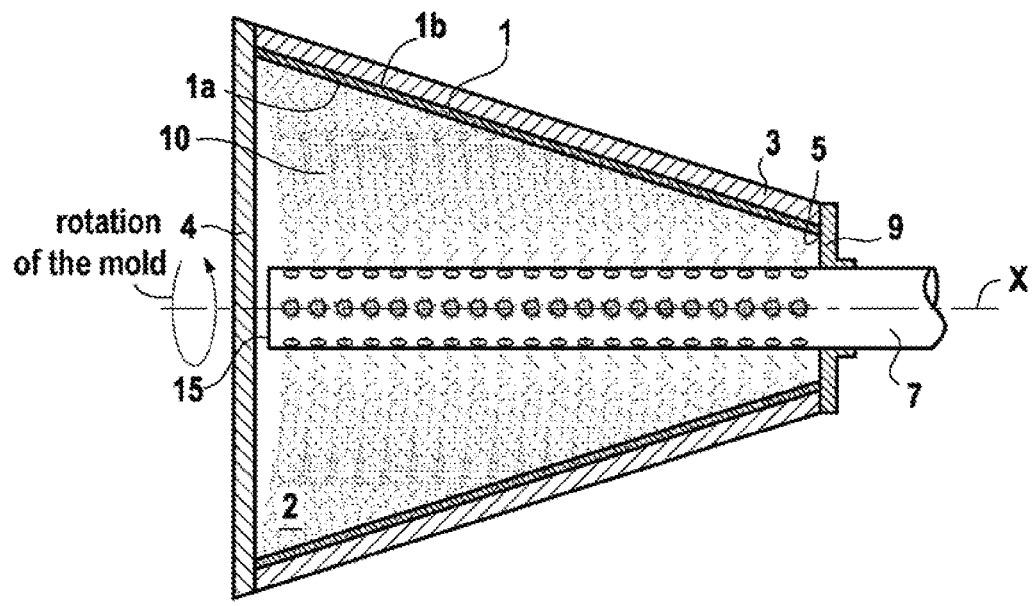
FIG. 4 shows the implementation of an example step of impregnating the first fiber texture as performed in the context of a method of the invention.

In order to impregnate the first texture 1, the mold is closed at its end 5 by the lid 9. Thereafter, the first suspension 10 comprising a first powder of solid particles in suspension in a liquid medium is introduced into the inside volume 2, as shown in FIG. 4. The particles of the first powder may be made of ceramic material, of metal material, or of carbon. In the example shown, the first suspension 10 is introduced into the inside volume 2 by spraying using the spray device 7.

Variants other than that shown in FIG. 4 are possible for the purpose of introducing a suspension of solid particles into the inside volume 2, as is described below.

The mold is set into rotation about the axis of rotation X at a non-zero speed of rotation in order to impregnate the first texture 1 with the first suspension 10 under the action of centrifugal force. The rotation of the mold may be started before or while introducing the first suspension 10 into the inside volume 2. In an implementation, the mold may be driven at a constant non-zero speed of rotation while impregnating the first texture with the first suspension. In a variant, the speed of rotation of the mold may be varied while impregnating the first texture with the first suspension.

It is possible to impregnate the first texture 1 with the first suspension up to saturation (i.e. until it is completely full). Under such circumstances, rotation of the mold is stopped after the first texture has been completely filled. In a variant, it is possible to fill the first texture with the first suspension in part only, and subsequently to introduce a third suspension different from the first suspension into the inside volume and then proceed with impregnating the first texture with the third suspension by rotating the mold. Under such circumstances, the impregnation of the first texture with the third suspension may optionally be performed until it is completely filled. When a third suspension is used, the method is then followed by positioning the second texture and by impregnation with the second suspension.

Figure 5:
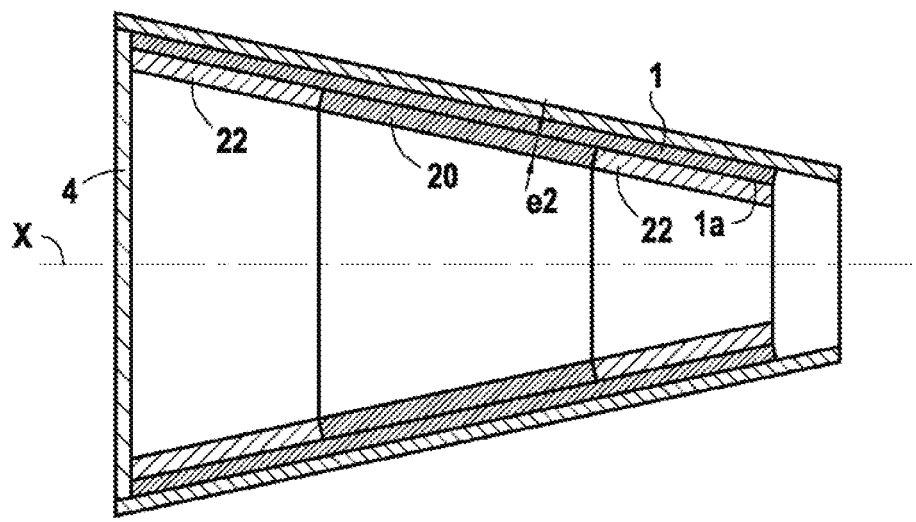
FIG. 5 shows the positioning of a second fiber texture against the inside face of the first fiber texture.

After the first texture 1 has been impregnated with the first suspension, a second fiber texture 20 may be fastened against the inside face 1a of the first fiber texture 1 in order to obtain a fiber assembly (see FIG. 5). The first suspension impregnating the first texture 1 may present sufficient adhesive power to enable the second texture 2 to be fastened to the inside face 1a of the first texture 1. In a variant, the second texture 20 may be fastened to the first texture 1 by using an additional adhesive element, e.g. an adhesive tape (Scotch®), or by a textile operation such as needling.

The second texture 20 may be held in position in the mold more securely by fastening the edges of the second texture to the mold by means of adhesive tape or by using a perforated hollow central core as mentioned above for the first texture.

The fiber assembly comprises at least the first and second fiber textures 1 and 20. By way of example, the second texture 20 may be for forming a zone of extra thickness in the fiber assembly, as shown in FIG. 5. The second fiber texture 20 may be fabricated in the same manner as described above for the first fiber texture 1. The second fiber texture 20 may have thickness $e_2$ greater than or equal to 0.5 mm, e.g. lying in the range 0.5 mm to 10 mm.

In the example of FIG. 5, an impermeable membrane 22 is also positioned against the inside face 1a of the first texture 1 in one or more zones other than the zone in which the second texture 20 is present. This membrane 22 serves to avoid the second suspension penetrating into the first fiber texture 1 when the mold is set into rotation. Naturally, it would not go beyond the ambit of the invention for an impermeable membrane not to be used. The impermeable membrane 22 may be held in position in the mold in the same manner as the first and second textures. In the example shown, the second texture 20 extends over only a portion of the inside face 1a of the first texture 1. In a variant that is not shown, the second texture extends over all of the inside face of the first texture.

Once the second texture 20 is in position on the inside face 1a, a second suspension comprising a second powder of solid particles in suspension in a liquid medium is introduced into the inside volume. The particles of the second powder may be made of ceramic material, of metal material, or of carbon. The mold is set into rotation about the axis of rotation X at a non-zero speed in order to impregnate the second texture 20 with the second suspension by the action of centrifugal force. The second fiber texture may be impregnated with the second suspension by using the spray device 7, as described above.

After being impregnated by the second suspension, the first texture may include particles of the first and second powders.

Figure 6:
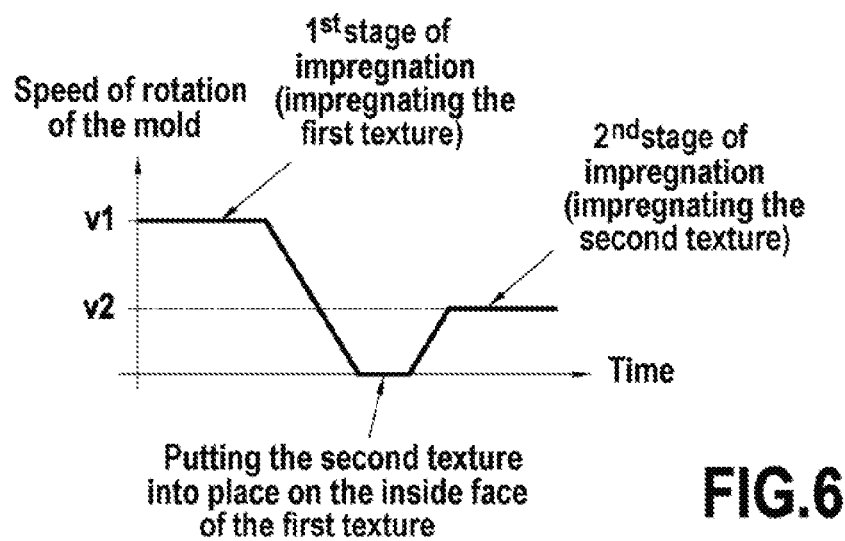
FIG. 6 shows how the speed of rotation imparted to the mold varies during an example method of the invention.

The speed of rotation of the mold used during impregnation of the first texture may be different from the speed used during impregnation of the second texture. The graph of FIG. 6 shows how the speed of rotation imparted to the mold may vary.

During impregnation of the first texture, it is thus possible to cause the mold to rotate at a first constant speed of rotation $v_1$ and then to reduce the speed of rotation of the mold continuously until the mold is stopped. The second texture 20 can then be put into position against the inside face 1a of the first texture 1, as shown in FIG. 5. Rotation of the mold is then restarted with a second constant speed of rotation $v_2$ being imparted in order to impregnate the second texture 20 with the second suspension. The duration of the first stage of impregnation (impregnating the first texture) may be longer than, equal to, or shorter than the duration of the second stage of impregnation (impregnating the second texture). Modifying the speed profile of the rotation imparted to the mold makes it possible, when so desired, to obtain a uniform distribution of particles across the thickness of the fiber assembly comprising the first and second textures.

In an implementation, the mold may be driven at a constant non-zero speed of rotation during impregnation of the second texture with the second suspension. In a variant, the speed of rotation of the mold during impregnation of the second texture with the second suspension may be varied. During impregnation of the second texture with the second suspension, it is possible to impart a speed of rotation to the mold that is less than or equal to or greater than the speed of rotation that was imparted to the mold during impregnation of the first texture with the first suspension.

By way of example, the speed of rotation imparted to the mold during all or part of the impregnation with the first suspension and/or with the second suspension may be greater than or equal to 1 revolution per minute (rpm), e.g. lying in the range 1 rpm to 5000 rpm.

Independently of the profile used for varying the speed of rotation of the mold and independently of the aspect of the invention under consideration, the spray device 7 may be moved in translation along the axis of rotation X during impregnation of the first and/or second texture 1 and/or 20. The end 15 of the spray device 7 may thus perform several go-and-return movements between two distinct positions spaced apart along the axis of rotation X. Independently of this movement in translation as described above, or in combination therewith, the spray device 7 may be caused to move in rotation during the impregnation of the first and/or second texture 1 and/or 20. Under such circumstances, the spray device 7 may rotate in the same direction of rotation as the mold or in the opposite direction, at the same speed of rotation as the mold or at a different speed of rotation. Imposing movement in translation and/or in rotation on the spray device 7 can advantageously serve to further improve the uniform nature of the impregnation performed. In a variant, the spray device 7 remains stationary during the impregnation of the first and second textures.

FIG. 3 shows a spray device 7 with a uniform distribution of orifices 8, these orifices 8 all being of the same size. Naturally, it would not go beyond the ambit of the invention if that were not the case. Specifically, in a variant, the spray device may present a first set of orifices presenting a first size and a second set of orifices presenting a second size different from the first. The first set of orifices may be situated in a first region of the spray device that is different from, and possibly separate from, a second region of the spray device containing the second set of orifices. The first and second regions may be offset along the axis of rotation X. For example, the first size may be greater than the second size and the first set of orifices may be situated facing a zone of the first fiber texture that is of greater diameter than the zone of the first fiber texture situated facing the second set of orifices. In a variant, the orifices of the first set and the orifices of the second set may be mixed together in the surface of the spray device.

In a variant or in combination with the above characteristic relating to the size of the orifices, the density of the orifices may vary on going along the surface of the spray device. Thus, the spray device may present orifices at a first density in a first region and may present orifices at a second density that is different from the first in a second region that is different from the first. The first and second regions may be offset along the axis of rotation X. For example, the first density may be greater than the second density and the first region may be situated facing a zone of the first fiber texture that is of greater diameter than the zone of the first fiber texture situated facing the second region.

In a variant, or in combination with the above characteristics, the geometrical distribution of the orifices in the spray device may vary on going along the axis of rotation X, with the orifices being arranged in a staggered configuration, for example.

In an embodiment, a layer of porous material (not shown) may be present between the outer face 1b of the first fiber texture 1 and the side wall 3 of the mold. This layer of porous material serves to drain the liquid medium of the suspension introduced into the first fiber texture while enabling the solid particles that have been introduced to be retained in the first fiber texture. By using a layer of porous material providing selective drainage of the liquid medium, it is possible to accumulate solid particles in the first fiber texture and thus increase the volume fraction of the matrix obtained at the end of the method.

Once impregnation of the first and second textures has terminated, the liquid medium of the first suspension and of the second suspension may be eliminated. This elimination may be performed by heating or by aspiration (evacuation). Thus, the mold may be provided with a heater member or it may be placed in a heated enclosure, or it may be connected to a pump device serving to evaporate the liquid medium. In a variant, after impregnating the first fiber texture with the first suspension, it is possible to eliminate the liquid medium of the first suspension and then impregnate the second fiber texture with the second suspension, and then eliminate the liquid medium of the second suspension.

The viscosity of the first suspension and/or of the second suspension may be about 30 millipascal-seconds (mPa·s) when measured using a Brookfield type viscosity meter at a temperature of 20° C.

In known manner, the first suspension and/or the second suspension may include an organic binder.

The volume content of solid particles in the first suspension and/or in the second suspension may be less than or equal to 40%. The volume content of solid particles in the first suspension and/or in the second suspension may be greater than or equal to 20%, e.g. it may lie in the range 20% to 40%. The invention may advantageously be used with suspensions that have a relatively large content of solid particles, since even though such suspensions present relatively high viscosity, it is still possible to perform impregnation with suspensions of this type by increasing the speed of rotation of the mold.

It is then possible to obtain a composite material part in which the assembly comprising the first and second textures constitutes the fiber reinforcement by forming a densification matrix phase, e.g. by sintering the solid particles present in the fiber assembly. In a variant, e.g. if the solid particles that have been introduced are carbon particles, it is possible to form a matrix phase by infiltrating the fiber assembly with a molten composition based on silicon in order to form a silicon carbide matrix phase by reaction between the carbon that has been introduced and the molten silicon. This implementation in which a matrix phase is formed by infiltrating a composition in the molten state may also be performed when the solid particles introduced by centrifuging are ceramic particles, e.g. carbide and/or nitride particles. Forming the densification matrix serves to further improve cohesion between the first and second textures.

Figure 7A:
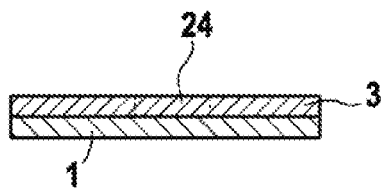
FIGS. 7A to 7C show a variant of the invention in which the second fiber texture is positioned on the outside surface of the first fiber texture.
Figure 7B:
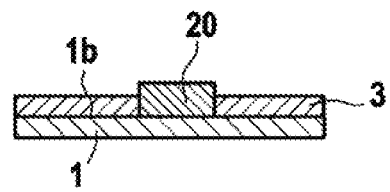
Figure 7C:
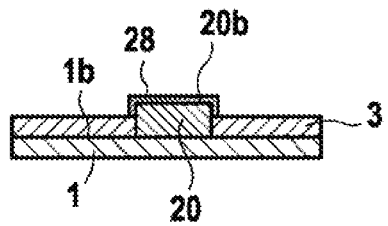
Figure 7C:

FIGS. 7A to 7C show a variant in which, after impregnating the first texture 1 with the first suspension, a first portion 24 of the mold that is situated in a first region facing the outer face 1b of the first texture 1 is removed. Thereafter, a second texture 20 is positioned on the outer face 1b of the first texture 1 in the first region (see FIG. 7B). A second mold portion 28 is then fastened over the first region facing an outer face 20b of the second fiber texture 20 (see FIG. 7C). As shown, the second mold portion 28 may be of a shape that is different from the first mold portion 24. Thereafter, the second suspension is introduced into the inside volume and the second texture is impregnated with the second suspension by rotating the mold fitted with the second mold portion. In this aspect, the porosity of the first texture is filled in part only with particles of the first powder as a result of impregnation with the first suspension so as to allow the second suspension to pass through the first texture in order to reach the second texture. It is thus possible to modify the shape of the mold while performing an implementation of the method of the invention.

The means described above for introducing the first suspension into the inside volume may be used to introduce the second suspension into the inside volume. In an implementation, the mold may be driven at a non-zero speed of rotation that is constant while impregnating the second texture with the second suspension. In a variant, the speed of rotation of the mold may be varied while impregnating the second texture with the second suspension. While impregnating the second texture with the second suspension, it is possible to impart a speed of rotation to the mold that is greater than the speed of rotation imparted to the mold while impregnating the first texture with the first suspension.

Independently of the implementation used, the second fiber texture may comprise yarns made of ceramic material, e.g. made of silicon carbide, or of refractory oxide, or of carbon.

It would not go beyond the ambit of the invention for the direction of rotation of the mold and/or of the spray device 7 to be reversed one or more times while impregnating with the first suspension and/or with the second suspension.

Figure 8:
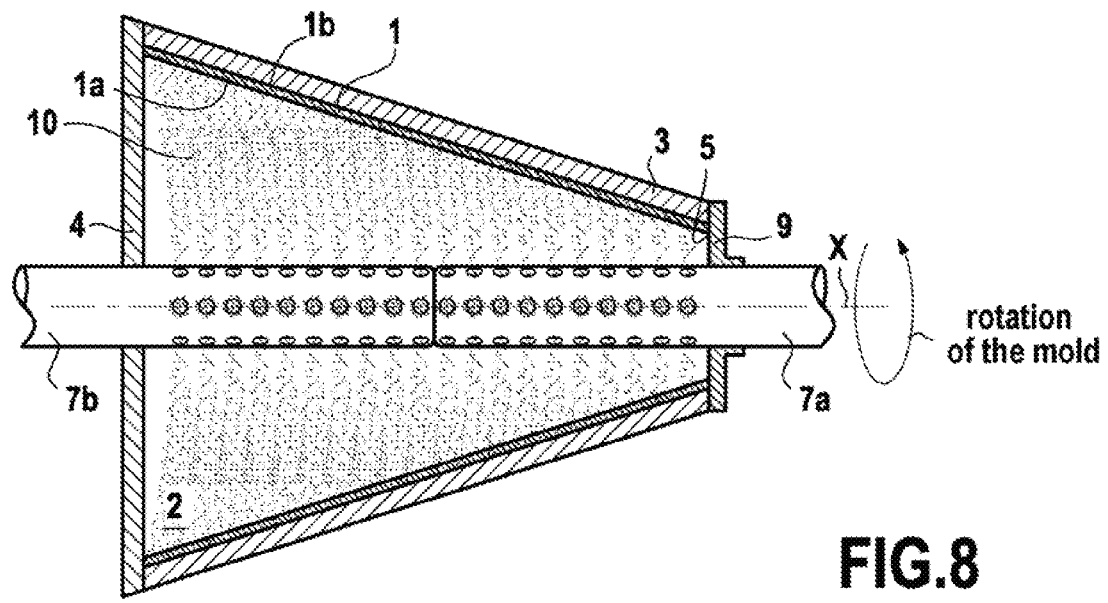
FIGS. 8 and 9 show the performance of different variants of the step of impregnating the first fiber texture in accordance with the invention.

FIG. 8 shows a variant of the step of impregnating the first texture 1, in which two spray devices 7a and 7b are used. Each of the devices 7a and 7b is positioned via an opposite end of the mold. Such a configuration may be used in the context of the first aspect of the invention or in the second aspect of the invention.

In the same manner as that described above, the device 7a and/or the device 7b may be driven with movements in rotation and/or in translation during impregnation.

Figure 9:
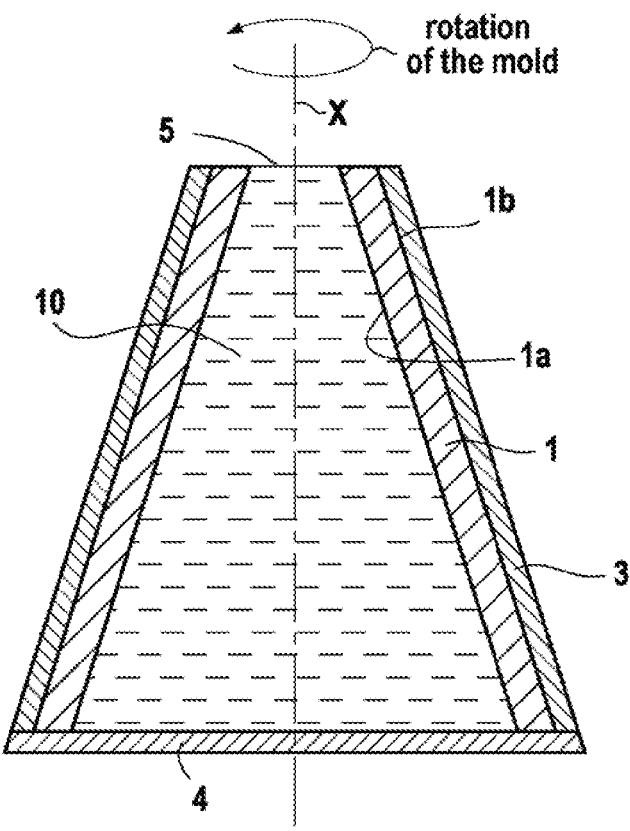

FIG. 9 shows a variant of the impregnation method of the invention. In the example shown in FIG. 9, the first suspension 10 is introduced by being poured into the inside volume. The suspension is introduced through the end 5 that is situated remote from the end wall 4 of the mold. The mold is then set into rotation as described above in order to impregnate the first texture 1 with the first suspension 10. In the example shown in FIG. 9, it is possible to pour a first fraction of the first suspension into the inside volume and then set the mold into rotation in order to impregnate the first texture 1 with said first fraction, and subsequently pour a second fraction of the first suspension into the inside volume in order to impregnate the first texture 1 with said second fraction while the mold is rotating. As shown in FIG. 9, the first suspension that is introduced may fill substantially the entire inside volume.

In a variant not shown, it is possible to use the same mold to impregnate a plurality of hollow fiber textures simultaneously with the same suspension of solid particles or with different suspensions. Under such circumstances, at least one separating partition is present in the inside volume of the mold, this separating partition defining two distinct processing chambers, with a fiber texture being present in each of the processing chambers.

In a variant that it not shown, once the second fiber texture has been impregnated, it is possible to position a third fiber texture and proceed with impregnating it with a suspension of particles by rotating the mold.

EXAMPLE

A first fiber texture of frustoconical shape presenting a small diameter of 10 centimeters (cm) and a large diameter of 150 cm, and made of alumina fibers of "Nextel 610" as supplied by the supplier 3M was put into a mold.

As shown in FIG. 1, the outer face of the first texture was placed facing a side wall of the mold, with the inside face of the first texture defining an inside volume. A first suspension of a powder of alumina of SM8 type constituting 20% by volume was introduced into the inside volume. In order to impregnate the first texture, the speed of rotation of the mold was set at 500 rpm for 30 minutes (min).

A second fiber texture of frustoconical shape presenting a small diameter of 120 cm and a large diameter of 130 cm and made of alumina fibers of "Nextel 610" was then positioned on the inside face of the impregnated first fiber texture in order to obtain a fiber assembly. An impermeable membrane was applied against zones of the inside face of the first fiber texture that were not covered by the second fiber texture.

A second suspension of an alumina powder of SM8 type constituting 20% by volume was introduced into the inside volume. In order to impregnate the second texture, the speed of rotation of the mold was set at 1000 rpm for 15 min.

Once the fiber assembly had been impregnated, the liquid medium of the first and second suspensions was eliminated by vacuum evaporation at a pressure lower than or equal to 23 millibars (mbars). The alumina particles were then sintered. The volumes of the first and second suspensions that were introduced were selected so as to obtain, after sintering, a fiber volume fraction in the part of about 50% and a matrix volume fraction of about 32%.

The term "lying in the range . . . to . . . " should be understood as including the bounds.

The invention claimed is:

1. A method of fabricating an impregnated fiber assembly, the method comprising:

introducing a first suspension comprising a first powder of solid particles of ceramic material, of metal material, or of carbon material into an inside volume defined by an inside face of a first fiber texture of hollow shape placed in a mold, an outer face of the first fiber texture being present facing a wall of the mold;

using the action of centrifugal force to impregnate the first fiber texture with the first suspension by rotating the mold;

after impregnating the first fiber texture with the first suspension, stopping the rotation of the mold, and then positioning a second fiber texture while the rotation of the mold is stopped on the inside face of the first fiber texture in order to obtain a fiber assembly;

introducing a second suspension comprising a second powder of solid particles made of ceramic material, of metal material, or of carbon, into the inside volume after putting the second fiber texture into position; and using the action of centrifugal force to impregnate the second fiber texture with the second suspension by rotating the mold in order to obtain an impregnated fiber assembly, the impregnation with the first suspension and the impregnation with the second suspension being carried out at different speeds of rotation of the mold.

2. A method according to claim 1, wherein a direction of rotation of the mold is reversed one or more times while impregnating with the first suspension and/or while impregnating with the second suspension.

3. A method according to claim 1, wherein the first and/or second suspension is introduced into the inside volume by spraying via one or more spray devices, the spray device(s) being driven with movement in translation and/or rotation during spraying.

4. A method according to claim 1, wherein the first fiber texture is axisymmetric.

5. A method according to claim 1, wherein the first fiber texture is obtained by two-dimensional weaving or by three-dimensional weaving.

6. A method according to claim 1, wherein the first fiber texture comprises refractory oxide ceramic yarns and wherein the particles of the first powder are refractory oxide ceramic particles.

7. A method of fabricating a composite material part, the method comprising:
fabricating a fiber assembly impregnated by performing a method according to claim 1; and then
forming a matrix phase from the particles of the first and second powders, thereby densifying the fiber assembly in order to obtain the composite material part.

8. A method according to claim 7, wherein the matrix phase is formed in full or in part by sintering the particles of the first and second powders.

9. A method of fabricating an impregnated fiber assembly according to claim 1, wherein the first and/or the second fiber texture are/is of frustoconical shape.

10. A method of fabrication an impregnated fiber assembly according to claim 1, wherein during impregnation with the second suspension an impermeable membrane is positioned in a zone not covered by the second fiber texture, the impermeable membrane being positioned against the inside face of the first fiber texture and the impermeable membrane serving to avoid the second suspension penetrating into the first fiber texture.

11. A method of fabricating an impregnated fiber assembly, the method comprising:
introducing a first suspension comprising a first powder of solid particles of ceramic material, of metal material, or of carbon material into an inside volume defined by an inside face of a first fiber texture of hollow shape placed in a mold, an outer face of the first fiber texture being present facing a wall of the mold;
using the action of centrifugal force to impregnate the first fiber texture with the first suspension by rotating the mold in order to fill the pores of the first fiber texture in part with the first powder;
after impregnating the first fiber texture with the first suspension stopping the rotation of the mold, and then, removing a first portion of the mold situated in a first region facing the outside face of the first fiber texture;
positioning a second fiber texture while the rotation of the mold is stopped on the outer face of the first fiber texture in the first region in order to obtain a fiber assembly;
positioning a second mold portion in the first region, the second mold portion, once in position, being situated facing an outer face of the second fiber texture;
introducing a second suspension comprising a second powder of solid particles made of ceramic material, of metal material, or of carbon into the inside volume; and
using the action of centrifugal force to impregnate the first and second fiber textures with the second suspension by rotating the mold fitted with the second mold portion in order to obtain the impregnated fiber assembly, the second suspension passing through the first fiber texture in order to reach the second fiber texture during this impregnation step, the impregnation with the first suspension and the impregnation with the second suspension being carried out at different speeds of rotation of the mold.

12. A method of fabricating a composite material part, the method comprising:
fabricating a fiber assembly impregnated by performing a method according to claim 11; and then
forming a matrix phase from the particles of the first and second powders, thereby densifying the fiber assembly in order to obtain the composite material part.

13. A method of fabricating an impregnated fiber assembly according to claim 11, wherein the first and/or the second fiber texture are/is of frustoconical shape.

* * * * *